US008443295B1

(12) United States Patent
D'Arcy et al.

(10) Patent No.: US 8,443,295 B1
(45) Date of Patent: May 14, 2013

(54) GRAPHICAL REPRESENTATION OF DEFINITIONS OF STATISTICS

(75) Inventors: Paul D'Arcy, Galway (IE); Tony McCormack, Galway (IE); Noel Griffin, Galway (IE); Michael Hartman, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1527 days.

(21) Appl. No.: 10/944,329

(22) Filed: Sep. 17, 2004

(51) Int. Cl.
*G06F 3/048* (2006.01)

(52) U.S. Cl.
USPC ........... 715/771; 715/736; 715/764; 715/969; 709/224; 717/105; 379/88.09

(58) Field of Classification Search ................... 715/736, 715/764, 969, 771; 709/223, 224; 717/105; 379/88.09
See application file for complete search history.

(56) References Cited

U.S. PATENT DOCUMENTS

| | | | | |
|---|---|---|---|---|
| 4,241,402 | A * | 12/1980 | Mayper et al. ..................... | 707/6 |
| 5,367,609 | A * | 11/1994 | Hopper et al. .................. | 704/278 |
| 5,432,932 | A * | 7/1995 | Chen et al. ..................... | 718/103 |
| 5,644,728 | A * | 7/1997 | Pillans ............................ | 705/43 |
| 5,652,714 | A * | 7/1997 | Peterson et al. ................ | 702/57 |
| 5,801,687 | A * | 9/1998 | Peterson et al. ........... | 715/500.1 |
| 6,170,011 | B1 * | 1/2001 | Macleod Beck et al. ..... | 709/224 |
| 6,292,933 | B1 * | 9/2001 | Bahrs et al. .................... | 717/107 |
| 6,505,342 | B1 * | 1/2003 | Hartmann et al. ............ | 717/104 |
| 6,718,533 | B1 * | 4/2004 | Schneider et al. ............ | 717/100 |
| 6,948,139 | B2 * | 9/2005 | Solomon .......................... | 716/2 |
| 7,002,583 | B2 * | 2/2006 | Rabb, III ....................... | 345/473 |
| 7,039,166 | B1 * | 5/2006 | Peterson et al. ........... | 379/88.18 |
| 7,188,332 | B2 * | 3/2007 | Charisius et al. ............. | 717/104 |
| 7,210,095 | B1 * | 4/2007 | Mor ............................... | 715/513 |
| 7,322,025 | B2 * | 1/2008 | Reddy et al. .................. | 717/121 |
| 7,392,162 | B1 * | 6/2008 | Srinivasan et al. ............... | 703/2 |
| 2001/0055372 | A1 * | 12/2001 | Glowny et al. ............ | 379/88.22 |
| 2003/0131338 | A1 * | 7/2003 | Georgalas ..................... | 717/104 |
| 2004/0139176 | A1 * | 7/2004 | Farrell et al. .................. | 709/220 |
| 2005/0060647 | A1 * | 3/2005 | Doan et al. .................... | 715/514 |
| 2005/0108364 | A1 * | 5/2005 | Callaghan et al. ............ | 709/219 |

OTHER PUBLICATIONS

Douglass, "UML Statecharts", Nov. 28, 2003, I-Logix, pp. 1-25, available at http://web.archive.org/web/20031128201747/http://www-md.e-technik.uni-rostock.de/ma/gol/ilogix/umlsct.pdf.*
Systa et al, "Automated compression of state machines using UML statechart diagram notation", Apr. 2002, Elsevier Science B.V., Information and Software Techonology 44, pp. 565-578.*
Hartmann et al, "UML-Based Integration Testing", 2000, ACM 1-58113-266-2/00/0008, pp. 60-70.*

(Continued)

*Primary Examiner* — Alvin Tan
(74) *Attorney, Agent, or Firm* — Barnes & Thornburg LLP

(57) ABSTRACT

Existing statistics reporting methods tend to be inflexible and difficult for operators to understand and use effectively. A graphical user interface is provided whereby operators are able to view a state/event model of an automated system and using that graphical user interface make changes to existing statistics, define new statistics and analyze existing statistics. As a result of user inputs made at this graphical user interface changes are effected in a statistics reporting application in order to generate actual values of the statistics. In some embodiments Unified Modeling Language (UML) is used to provide the state/event model and extensions to UML are described which improve the ability to create and modify definitions of statistics.

20 Claims, 6 Drawing Sheets

OTHER PUBLICATIONS

Khriss et al, "Automating the Synthesis of UML Statechart Diagrams from Multiple Collaboration Diagrams", 1998, Departement d'informatique et de recherche operationnelle Universite de Montreal, pp. 1-12; obtained from http://www.iro.umontreal.ca/~keller/publications/papers/incs1618.pdf.*

Schonberger et al, "Algorithmic Support for Model Transformation in Object-Oriented Software Development", 2001, Departement d'informatique et de recherche operationnelle Universite de Montreal, pp. 1-29; obtained from http://www.iro.umontreal.ca/~keller/publications/papers/ccpe-2001.pdf.*

Whittle et al, "Generating Statechart Designs From Scenarios," Jun. 2000, ACM, International Conference on Software Engineering—Proceedings of the 22nd international conferece on Software engineering, ISBN: 1-58113-206-9, pp. 314-323.*

OMG Unified Modeling Language Specification, Version 1.3, Jun. 1999.

* cited by examiner

GRAPHICAL REPRESENTATION OF DEFINITIONS OF STATISTICS

FIELD OF THE INVENTION

The present invention relates to a graphical representation of definitions of statistics. The invention also relates to a method and apparatus for displaying definitions of statistics and a method and apparatus for creating a state/event model.

BACKGROUND TO THE INVENTION

Statistics are often used to enable managers and operators to assess the behavior or performance of automated systems of many types. This application is particularly concerned with contact centers and self-service systems although the invention itself is not limited to those types of system; any automated system which can be represented using a state/event model can be used.

Previously, statistical information about the performance of contact centers and self-service systems has been generated using hard-coded methods incorporated into the processing of the contact center or self-service system itself (or an associated reporting application). The resulting statistical values calculated using the hard coded processes are then typically written out to a database from which reports are automatically generated for use by system operators. Examples of such statistics for a call center, include average call time and total number of calls answered in a specified time frame.

Such known statistic reporting methods are subject to various drawbacks. For example, operators are unable to easily obtain values of new statistics. In order to do so it would be necessary to modify and add to the hard coded process for statistic generation within the automated system itself. Thus operators are unable to obtain values of new statistics on an ad-hoc basis. Also, it is not easy or straightforward for operators to obtain information about how a particular statistical value has been obtained. For example, a statistical value such as an average may be provided. The operator is unable to quickly assess which values have been used to calculate this average without resorting to analysis of the hard-coded methods used. Another disadvantage is that because the methods for statistics generation are hard coded, then if changes are made to the operation of the automated system itself, the statistics will not necessarily remain an accurate description of the behavior of that automated system. For example, if the methods used within a contact center change slightly, the statistics generated may no longer be a good indication of the behavior of that contact center. In some cases such a change in methods used can lead to corruption of the statistical data generated.

An object of the present invention is to provide a method and system for generating statistics about the behavior of an automated system which overcomes or at least mitigates one or more of the problems mentioned above.

SUMMARY OF THE INVENTION

According to an aspect of the present invention there is provided a method of displaying definitions of statistics to be calculated about the behavior of an automated system, said method comprising the steps of:
  accessing a state/event model of the automated system;
  displaying graphical representations of the state/event model at a user interface;
  displaying said definitions of statistics using said graphical representations of the state/event model at the user interface said graphical representations being arranged such that only a single graphical element is required to represent a transition selected from a virtual transition between two or more states and a transition between two or more states which are of different objects.

This provides the advantage that an end user or operator is able to view the graphical representations and use them to easily and quickly understand what statistics are to be calculated about the behavior of the automated system. Also, because only a single graphical element is required to indicate a virtual transition or a transition between states of different objects, the overall graphical representation is simplified and easier for the end user or operator to understand and interpret.

Preferably the method further comprises generating a definition of a statistic to be calculated about the behavior of the automated system by:
  receiving user inputs about one or more states in said state/event model to be used in said generated definition and generating said definition using the graphical representations of those one or more states.

This provides the advantage that the operator is quickly and easily able to create new statistical definitions on an "ad hoc" basis, those statistical definitions to be used for analyzing the behavior of the automated system.

Preferably the method further comprises accessing pre-specified definitions of statistics and generating said definition using both the graphical representations and one or more of the pre-specified definitions. This provides the advantage that standard definitions used in the industry or field can be used without the need for the operator to fully specify those definitions.

In another embodiment the method preferably further comprises modifying a definition of a statistic to be calculated about the behavior of the automated system by:
  displaying said definition of the statistic using said graphical representations of the state/event model at the user interface and receiving user inputs about said graphical representations; and
  modifying said definition on the basis of the user inputs.

This enables the operator to quickly and easily change existing statistical definitions to be used when analyzing the automated system. For example, this may be required if there are changes in the mode of operation of the automated system itself.

Advantageously the automated system is selected from a contact center and a self-service system. In these situations statistical information about the performance or behavior of the system is particularly needed by operators.

In a preferred embodiment the method further comprises passing information about said graphical representations of the definitions of statistics to a reporting application, said reporting application being arranged to calculate statistics according to those definitions about the behavior of the automated system.

Preferably the user interface comprises web pages. This is advantageous because the operator is able to access those web pages over the internet for example and is provided with a familiar and easy to operate interface.

Preferably the web pages are formed using scalar vector graphics extensible markup language (SVG XML). This provides the advantage that user inputs made by the operator at the GUI are easily detectable.

Preferably the state/event model is provided using Unified Modeling Language (UML). This provides the advantage that a simple and effective means of providing the state/event model is available.

Advantageously said UML is extended to provide for a single graphical element to represent a virtual transition between two or more states. This enhances the ability of the UML to represent statistical definitions in particular situations.

Preferably said UML is extended to provide for a single graphical element to link two or more states which are of different objects. This also enhances and simplifies the ability of the UML to represent statistical definitions in particular situations.

Preferably said UML is extended to provide for a graphical element to link two or more states said link having an associated markup statement comprising a guard condition.

Preferably said UML is extended to provide for a graphical element to link two or more states said link having an associated markup statement comprising an action expression.

According to another aspect of the present invention there is provided an apparatus for displaying definitions of statistics to be calculated about the behavior of an automated system, said apparatus comprising:
  an input arranged to access a state/event model of the automated system; and
  a graphical user interface arranged to display graphical representations of the state/event model and also to display said definitions of statistics using said graphical representations of the state/event model; said graphical representations being arranged such that only a single graphical element is required to represent a transition selected from a virtual transition between two or more states and a transition between two or more states which are of different objects.

The invention also encompasses a contact center comprising an apparatus as described above; a self-service system comprising an apparatus as described above and a computer program arranged to carry out the method described above. Said computer program is preferably stored on a computer readable medium.

According to another aspect of the present invention there is provided a method of creating a state/event model comprising the steps of:
  using Unified Modeling Language (UML) to create a graphical representation of said state/event model;
  using a single graphical element to represent a virtual transition between two or more states of said state/event model.

This extended UML provides an improved, simplified way in which to create state/event models for statistical definitions.

According to another aspect of the present invention there is provided an apparatus for creating a state/event model comprising:
  a processor arranged to use Unified Modeling Language (UML) to create a graphical representation of said state/event model; and
  said processor also being arranged to use a single graphical element to represent a virtual transition between two or more states of said state/event model.

The preferred features may be combined as appropriate, as would be apparent to a skilled person, and may be combined with any of the aspects of the invention.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "state/event model" is used herein to refer to that part of the object model of a system that details the states of objects of a given type; the possible transitions between the states; the triggering events that initiate the state transitions; and the object behavior required on state transitions and within states.

The term "virtual transition" is used herein to refer to a transition between two states of a single object, in which the transition occurs via one or more intermediate states.

The term "graphical representation" is used herein to refer to a pictorial image intended to indicate an entity, action or event. This is not intended to include pure text although pictorial images that also include text can be a graphical representation as meant herein. Similarly a "graphical element" is not intended to include pure text but must comprise a pictorial image.

As mentioned above there are many problems with existing statistics reporting methods because these tend to be inflexible and difficult for operators to understand and use effectively. This in turn makes it difficult for those operators to manage the behavior of automated systems such as contact centers and self-service systems. The present invention addresses these problems by providing a graphical user interface whereby the operator is able to view a state/event model of the automated system and using that graphical user interface make changes to the existing statistics. As a result of user inputs made at this graphical user interface changes are effected in a statistics reporting application in order to generate actual values of the statistics generated or defined by the operator using the user interface.

Figure 1:
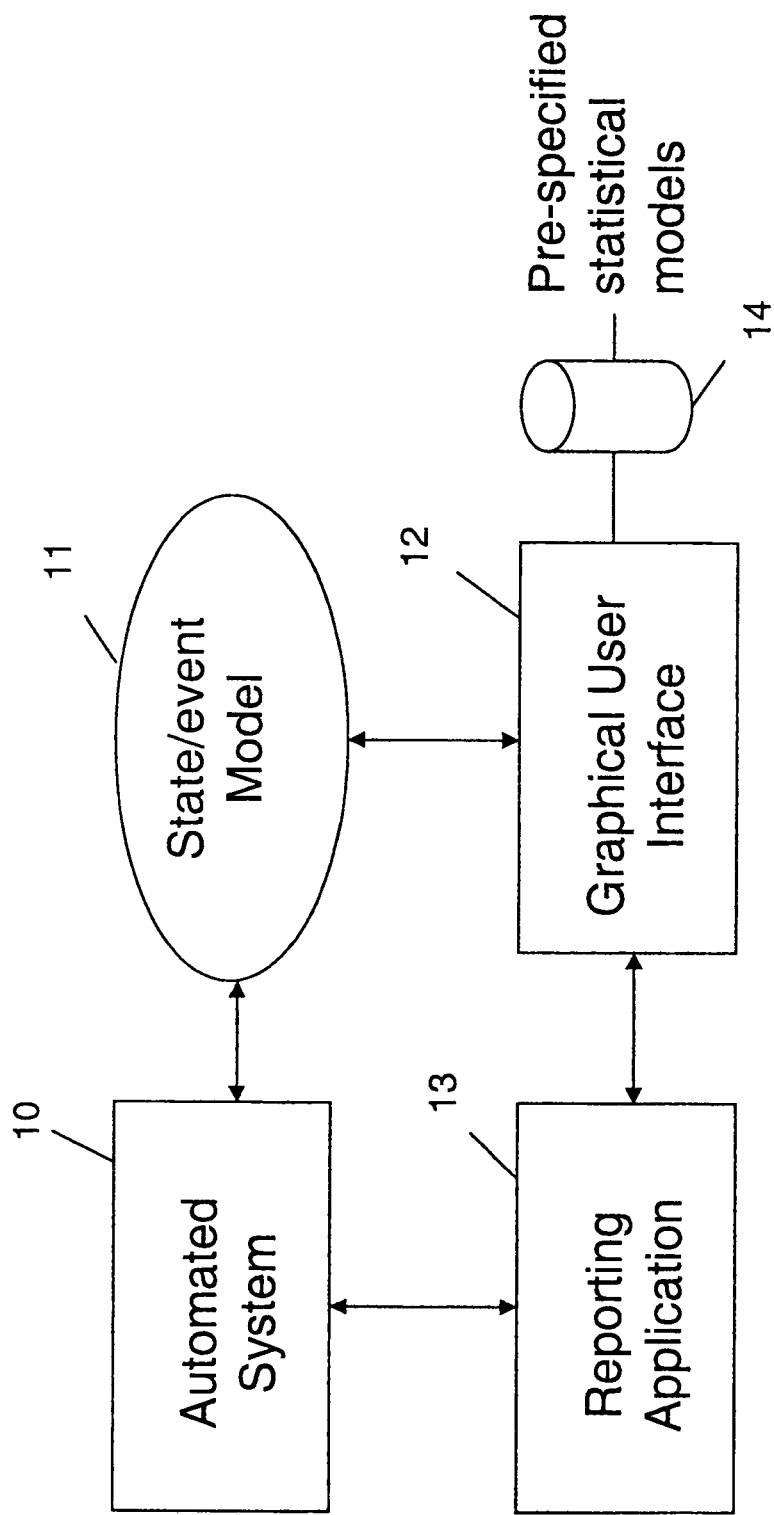
FIG. 1 is a schematic diagram of a system for generating statistics.

FIG. 1 is a schematic diagram of a system for generating statistics. An automated system 10 such as a contact center or self-service system is present and it is required to analyze or monitor the behavior of this system using statistics. The automated system may be any system which can be represented using a state/event model. Thus FIG. 1 shows a state/event model 11 of the automated system 10. This state/event model may be provided in memory incorporated within the automated system itself or in a separate entity in communication with the automated system 10. A graphical user interface (GUI) 12 is provided which displays details of the state/event model 11 to an operator or other end user. Any suitable type of GUI can be used such as web pages or other graphical displays. The GUI is in communication with the state/event model 11 in order that any changes in the state/event model 11 are accurately reflected in the GUI 12. Also the GUI 12 is in communication with a reporting application 13 which generates statistical reports about the automated system 10 and allows the obtained statistical information to be viewed at the GUI 12. In addition user inputs at the GUI 12 enable the reporting application 13 to be controlled and modified automatically.

Using the GUI the operator or other end user is able to define new statistics, look at current statistics defined for the automated system 10 and modify existing statistics. In one embodiment a database 14 of pre-specified statistical models is provided and is accessible by the GUI 12. The operator is then able to generate statistical definitions by selecting one or more elements of the state model and associating a pre-specified statistical definition from database 14 with those one or more elements. Once a new statistical definition is created at the GUI 12 in this way, details of the new definition are fed to the reporting application 13 allowing that reporting application to actually generate values of the newly defined statistics using data from the automated system 10. Similarly the GUI 12 can be used to generate new statistical groupings, new statistical calculation intervals and other configurational aspects of the reporting application 13.

Scalar Vector Graphics Example

In a preferred example the GUI comprises one or more web pages generated using a Scalar Vector Graphics XML (extensible mark-up language) document. In this case each component or state of the state/event model 11 is represented at the GUI using a section of that XML document. In order to detect user inputs or selections made at the GUI the Scalar Vector Graphics DOM command or process is then used. In this way it is possible to detect when the operator selects different states for the purpose of defining new statistics or modifying statistics. An XML representation of the statistical definitions is then created by the GUI on the basis of the user inputs. This XML representation is passed to the reporting application 13 which parses the received XML representation in order to obtain the information it needs to calculate statistical values according to the new or modified definitions.

Figure 2:
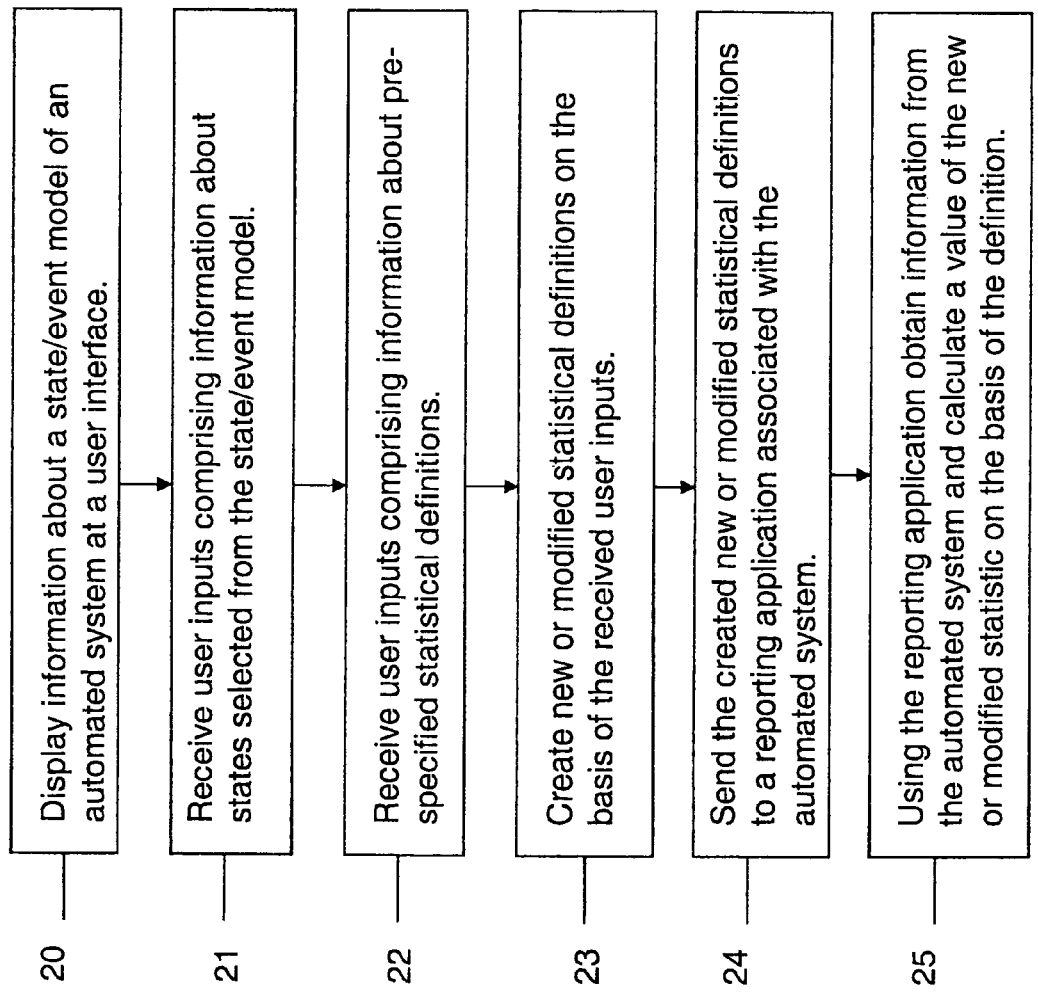
FIG. 2 is a flow diagram of a method of generating or modifying a statistical definition.

FIG. 2 is a high level flow diagram of a method of generating a new statistical definition and using that to obtain an actual value of that statistic from the automated system 10. The method involves at the GUI 12 displaying information about a state/event model of the automated system 10 (see box 20 of FIG. 2). At the GUI user inputs are received comprising information about states selected from the state/event model (see box 21 of FIG. 2). Optionally user inputs are also received at the GUI comprising information about pre-specified statistical definitions (see box 22 of FIG. 2). The GUI itself 12 or an associated processor then creates new or modified statistical definitions on the basis of the received user inputs (see box 23 of FIG. 2). These statistical definitions are sent to the reporting application 13 (see box 24) which uses them to calculate actual values of those statistics (see box 25).

The operator is also able to use the GUI to obtain information about existing statistical definitions being used by the reporting application 13. Names or other identifiers for those existing statistical definitions are displayed by the GUI and if an operator selects one of these an indication of which states in the state/event model are being used in that statistical definition is displayed. Information about any associated pre-specified statistical definitions 14 being used together with these states may also be presented. This allows the operator to gain understanding of how the statistical values reported by the reporting application 13 are calculated.

In a preferred embodiment the state-event model 11 is formed using an improved version of UML (unified modeling language). UML is published by the Object Management Group (OMG) and it is a method of using diagrams for specifying, visualizing and documenting models of software and other non-software systems. UML defines twelve types of diagrams divided into three categories: four diagram types represent static application structure; five represent different aspects of dynamic behavior; and three represent ways of organizing and managing application modules.

Figure 3:
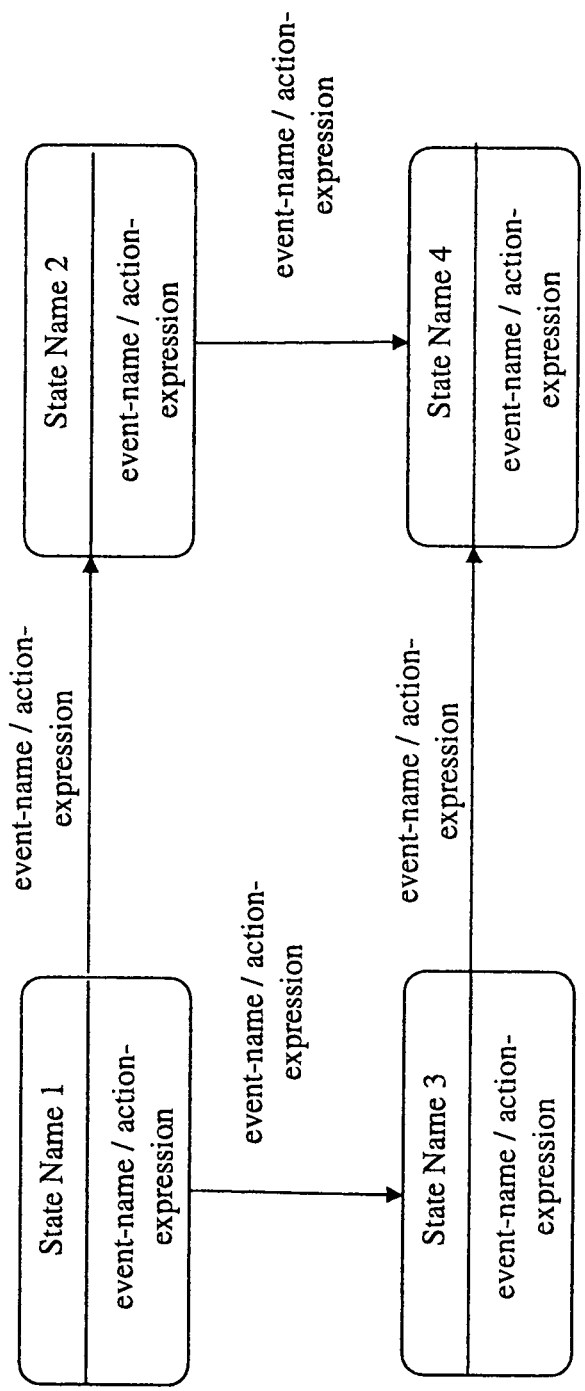
FIG. 3 is an example of a UML (Unified Modeling Language) statechart according to the prior art.

The UML includes notations and graphical elements for describing state transition diagrams, known as Statecharts. A statechart describes the dynamic behaviour of a single object in a system as a sequence of states through which the object will transition in response to stimuli called Events. A simplified example of a UML statechart with four generalized states and several events/transitions is shown in FIG. 3 (this is not intended to be a complete definition of the UML statechart format. For that, refer to the OMG Unified Modeling Language Specification, version 1.5 which is incorporated herein by reference).

As shown in FIG. 3, there are mechanisms in a statechart that can be used to specify actions to be performed, either while within a state, or on a state transition. The event/action syntax allows for a wide range of event processing to be modelled, including transition actions that must complete fully; actions that may or may not complete (those within a state); and actions that may be time-bound in some way, for example, having either fixed start/stop times or durations.

Figure 4:
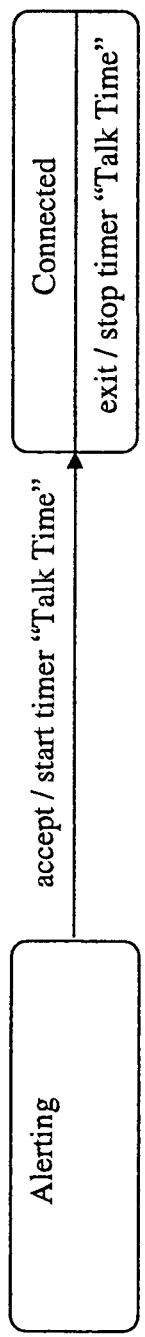
FIG. 4 is an example of a UML statechart for generating a "talk time" statistic.

For the purpose of statistics generation, the standard UML event/action notations allow for several useful techniques. A simple example is to use state exit events to stop a duration timer, as shown in FIG. 4. In FIG. 4 an object is shown as having one of the two possible states, "alerting" and "connected". For example, the object may represent a telephone terminal. In the "alerting" state the telephone terminal receives a request for an incoming call. When this call is accepted a timer is started to determine a talk time for the call (see arrow between the states in FIG. 4). When the "connected" state is left then the timer is stopped (see exit event within "connected" state in FIG. 4).

Although it may be possible to use UML to represent all types of statistics generation, there are several instances in which such use is complex or convoluted. We have therefore developed an extension of the concepts in UML which lend themselves to a more straightforward way of representing statistics generation in a graphical format.

Transition-Path Dependent Statistics

A statistic may be required to track a duration across multiple states and several optional transition paths. For example, consider the statechart in FIG. 3.

If it is desired to create a statistic which measures the duration of time from when the object entered state 1 and exited state 4, provided the path includes state 2, this can be handled in standard UML by judicious crafting of "event/action-expression" statements (perhaps with UML "guard-condition" clauses) along a particular transition path and/or within certain states in the diagram. However, even in the simple FIG. 3 situation, not to mention a complex statechart of dozens of states and transitions, the intent of the design of this statistic can easily be lost. This is because the graphical elements in the diagram represent only single states, and transitions between them. There is no graphical symbol to explicitly distinguish a particular transition path, i.e., from state 1 to state 2 to state 4. Hence there is no single element to which an event/action for measuring the time along a particular path can be attached.

An example of such a statistic would be "duration of all queuing calls that have undergone IVR (interactive voice response) treatment but not recorded music treatment during the call".

A related problem is if the statistic is independent of the particular optional transition path between states. For example, if we desired to measure the time from state 1 to 4, without regard to whether the object passed through state 2 or 3, this also makes the representation using standard UML potentially complex, or at least verbose. Such virtual state transitions can be represented in UML using composite or "super" states, but in some cases this obscures the design of the state model by introducing an otherwise unrequired hierarchy to the model.

An example of such a statistic would be "duration of all calls that have undergone any type of call treatment prior to being answered".

Multi-Object Dependent Statistics

Because a UML statechart applies to a single object only, statistics which are dependent on the relative states of more than one object cannot be easily represented in standard UML. To do so in standard UML would require co-ordinated use of "event/action-expression" statements within the statechart of the first object, which reference the state of a second object. Although this is clearly possible in UML, it obscures the design of the statistic because there is no graphical/visual association between the multiple statecharts involved.

An example of such a statistic would be "number of calls terminated due to a queue being out of service". In this example, the first object is "a call", which has state "terminated", and the second object is "a queue", which has state "out of service".

In order to address the above mentioned problems we introduce a new graphical element to UML which allows description of a virtual transition between any two states, along with a markup statement which allows specification of the full actual path and some context/history information. The precise syntax of the new graphical element and markup statement can be of any suitable form. In the example given in FIG. 5, the new graphical element is represented by a dashed line arrow 50 and the new markup statement is an italicized label 51.

Figure 5:
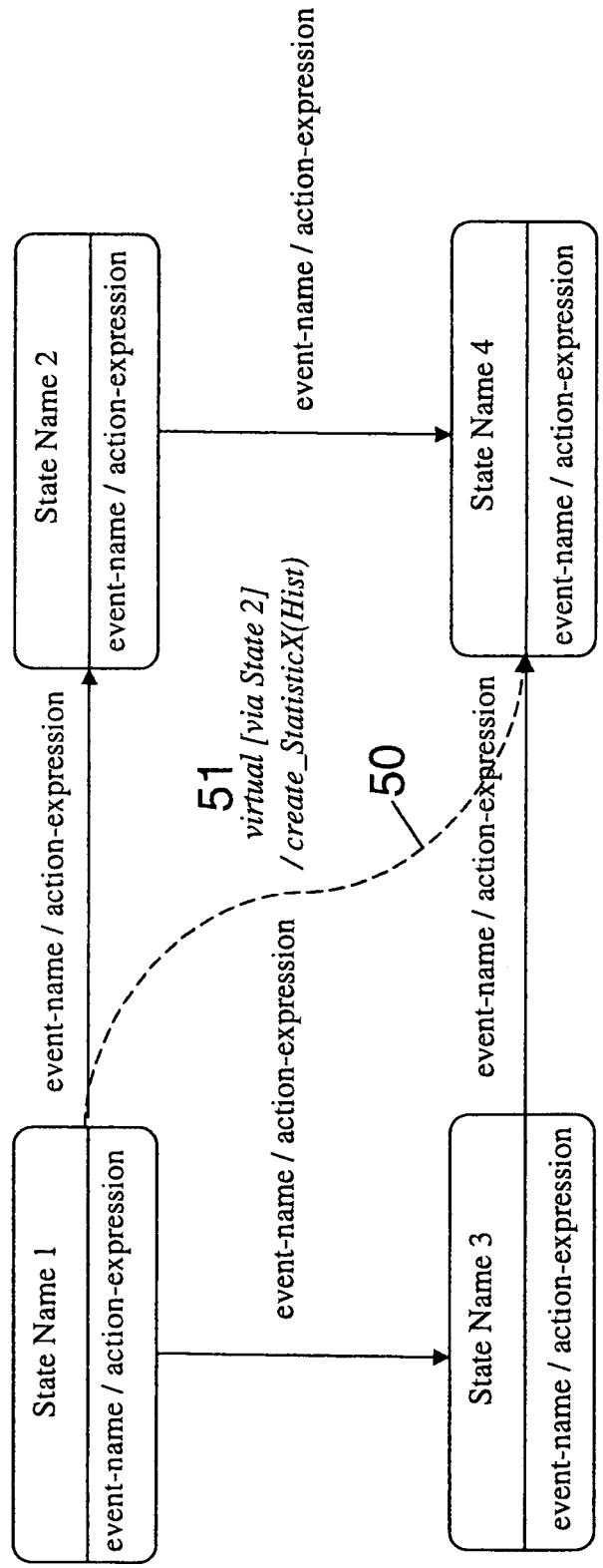
FIG. 5 is an example of a UML statechart using an improved version of UML and showing a virtual transition.

FIG. 5 is an example of a statechart using our improved version of UML. FIG. 5 is the same as FIG. 3 except that dashed line arrow 50 and italicized label 51 are shown. This addresses the problem mentioned above in the section headed "Transition path dependent statistics". The new graphical element represents a virtual transition between two states and the markup statement comprises specification of the actual full path to be taken between those two states.

Thus in FIG. 5 a triggering event for the transition between states 1 and 4 via state 2 is called "virtual" and includes a guard condition "[via State 2]", and an action-expression "create_StatisticX(Hist)". In this case, the create_StatisticX (Hist) action is to be called only if the transition from State 1 to State 4 was via State 2.

Figure 6:
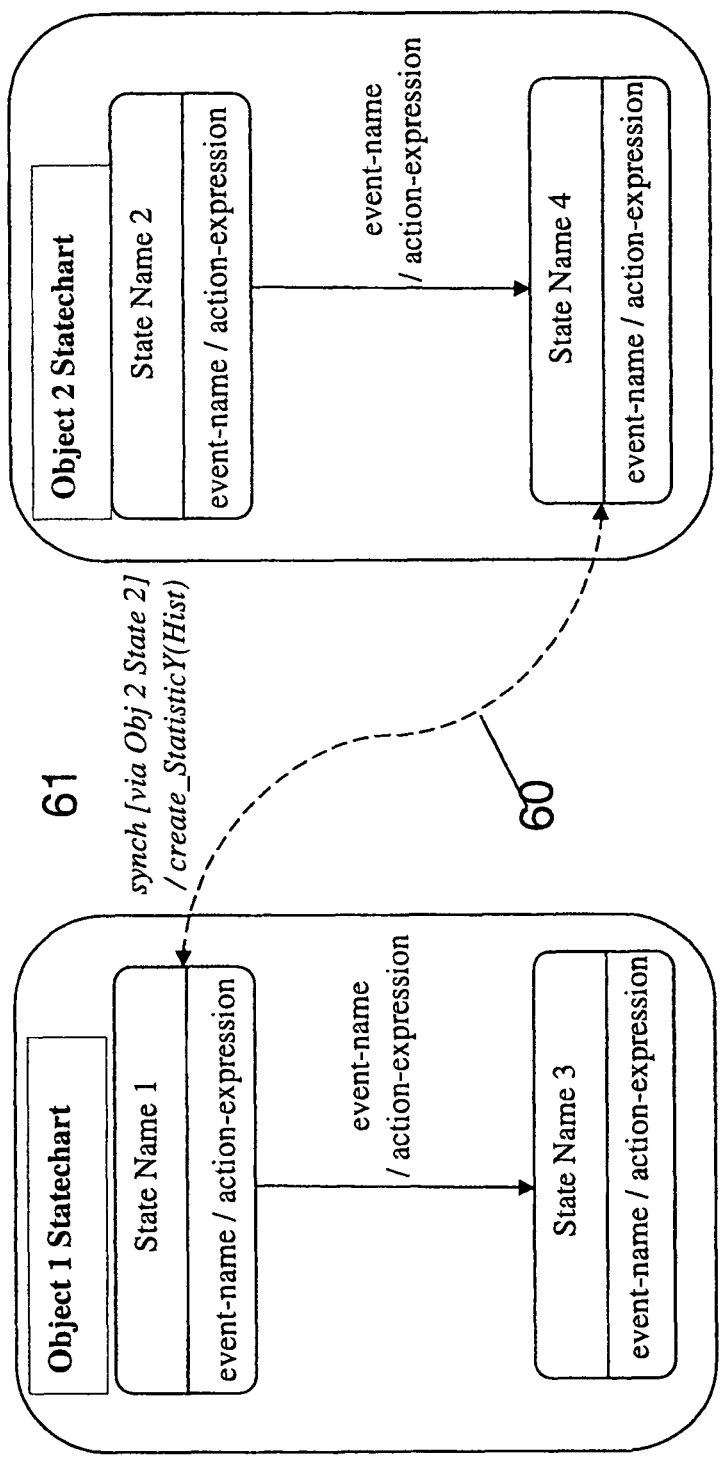
FIG. 6 is an example of a UML statechart using an improved version of UML and showing a synch event.

The present invention also addresses the problem mentioned above under the heading "Multi-object dependent statistics". Again a new graphical element is used together with a new markup statement. These can be of any suitable syntax or form. For example, FIG. 6 shows two UML objects both with their own statecharts. In this example statistic Y is calculated when the state of Object 2 corresponds to a particular state of Object 1, as indicated by a double-headed dashed arrow 60. The event in this case is called "synch", and includes guard condition "[via Obj 2 State 2]". In this case, the action "create_StatisticY(Hist)" is called only when the transition to State 4 in Object 2 is via State 2. Similar and more complex guard conditions are catered for. Thus the new graphical element 60 and markup statement 61 are used to represent a statistic to be calculated dependent on the relative states of two objects.

Thus in all the embodiments involving our improved version of UML there is provided a new graphical element to link two states and either to represent a transition between two states via an indirect path, or to represent an association between two or more states of different objects. In addition, all those embodiments provide a markup statement in association with the new graphical element. The markup statement optionally comprises a guard condition but always comprises an action expression. More detail about the guard condition is now given.

Guard Condition

As mentioned above, some embodiments of the invention use an optional guard condition, which is provided using any suitable syntax. The guard condition, in some embodiments, includes provision to declare a precise path, or parts of a path, which are either required to be traversed, or required not to be traversed. For example, the guard condition may specify that State 2 is required in the path or that State 3 must not be in the path (in more complex state machines, the guard condition provides for specification of "don't care" or wildcard states). For "synch" events, that is, events which depend on the relative states of more than one object, the guard condition also allows for the qualification of the specified states by the Object to which it applies (i.e., to the statechart in which it appears). It also allows the specification of synch semantics, i.e., that one of the objects must be in the state before, during, or after another; or that they must enter or exit simultaneously or sequentially or in some order, etc. As mentioned above, the guard condition is optional. If omitted, then the action-expression is taken on any virtual transition from the source to the destination state, independently of the intermediate states.

History

The action-expression allows for specification of a transition history, indicated by "Hist" herein, which includes but is not limited to: the actual path taken, including all intermediate states; the time at which a state was entered or exited; the triggering events that led to each or any state transition in the path; and the evaluation of each or any guard conditions along the path. The "Hist" parameter may include history of multiple objects. Some embodiments of this invention require that such a history be specifiable in the action-expression. Any suitable syntax can be used for this transition history.

Although the examples discussed pertain to the calculation of duration statistics, the solution is applicable to systems which generate other types of measurements/statistics, including counts, minima, maxima, etc.

In preferred embodiments of the present invention the improved UML described herein is used to provide the state/event model 11 of FIG. 1 and this improves the operator or end user's ability to view statistical definitions based on that state/event model 11 at the GUI 12. The operator's ability to modify those definitions or create new statistical definitions is also improved for the same reasons. In addition another advantage is provided. That is existing or modified UML modeling tools can be used to automatically generate source code from the UML statechart models output by the GUI. Thus for example in the method of FIG. 2 the GUI (or an associated processor) creates new or modified statistical definitions on the basis of the received user inputs (box 23). These definitions comprise UML statecharts for example. Those UML statecharts are then sent to the reporting application (box 24) which uses UML modeling tools or other suitable means to generate source code to implement the statistical definitions. By executing this source code the reporting application is then able to calculate values of the statistics (box 25 of FIG. 2).

Alternatively, the UML statechart models are transformed into XML using any suitable known mapping between UML and XML as known in the art. That XML is then parsed using standard XML parsers, after which the reporting application 13 is able to use the parsed information to generate software for calculating the defined statistics.

This transformation of the UML statechart models into XML is either achieved by a direct mapping from the UML graphical elements into XML elements, or alternatively, it may be achieved by mapping from an internal representation of the UML model (made in SVG for example) into XML. This is now explained in more detail.

UML is a graphical language whereby each shape and the connections between them have a precise syntax and meaning. In general, only the graphical elements are part of the UML standard (the internal representation of the model, for example, as it exists in a file before it is drawn on screen, is not part of the standard). Thus it is possible to have either a direct mapping from the UML graphical elements to XML elements or a mapping from the internal representation of the UML model to XML.

For example, in the case where SVG is used to create the internal representation of the graphical layout of a UML model (or other state/event model), that SVG can be converted to XML as mentioned above in the section headed "Scalar Vector Graphics example". The XML can then be used by the reporting application 13 to generate software for calculating the defined statistics.

The invention claimed is:

1. A method of generating a statistical definition defining statistics to be calculated about the behavior of an automated system, said method comprising the steps of:
   (i) accessing a state/event model of the automated system, the state/event model comprising a plurality of states;
   (ii) displaying a graphical representation of the state/event model at a user interface, the graphical representation comprising graphical elements representing the plurality of states of the state/event model;
   (iii) receiving user inputs comprising information to select states from the state/event model to generate a new statistical definition;
   (iv) displaying at the user interface said newly generated statistical definition using the graphical representation of the state/event model and an additional graphical element, said additional graphical element being arranged such that only a single graphical element is required to represent a selected one of: (a) a virtual transition between two or more states of the state/event model; and (b) a transition between two or more states of the state/event model which are of different objects,
   wherein said additional graphical element is added to the graphical representation in addition to the graphical elements representing the plurality of states of the state/event model.

2. A method as claimed in claim 1 which further comprises accessing pre-specified definitions of statistics and generating said statistical definition using both the graphical representation and one or more of the pre-specified definitions.

3. A method as claimed in claim 1 which further comprises modifying a generated statistical definition defining a statistic to be calculated about the behavior of the automated system by:
   (i) displaying said definition of the statistic to be modified using said graphical representation of the state/event model at the user interface and receiving user inputs about said graphical representation; and
   (ii) modifying said definition of the statistic to be modified on the basis of the user inputs.

4. A method as claimed in claim 1 wherein said automated system is selected from a contact center and a self-service system.

5. A method as claimed in claim 1 which further comprises passing information about said graphical representation of the generated statistical definition defining statistics to a reporting application, said reporting application being arranged to calculate statistics according to the generated statistical definition about the behavior of the automated system.

6. A method as claimed in claim 1 wherein said user interface comprises web pages.

7. A method as claimed in claim 1 wherein said user interface is formed using scalar vector graphics extensible markup language (SVG XML).

8. A method as claimed in claim 1 wherein said state/event model is provided using Unified Modeling Language (UML).

9. A method as claimed in claim 8 wherein said UML is extended to provide for a single graphical element to represent a virtual transition between two or more states.

10. A method as claimed in claim 8 wherein said UML is extended to provide for a single graphical element to link two or more states which are of different objects.

11. A method as claimed in claim 8 wherein said UML is extended to provide for a single graphical element to link two or more states, said link having an associated markup statement comprising a guard condition.

12. A method as claimed in claim 8 wherein said UML is extended to provide for a single graphical element to link two or more states, said link having an associated markup statement comprising an action expression.

13. An apparatus for generating a statistical definition defining statistics to be calculated about the behavior of an automated system, said apparatus comprising:
   a) a processor executing program code;
   b) an input arranged to access a state/event model of the automated system, the state/event model comprising a plurality of states;
   c) an input arranged to receive user inputs comprising information to select states from the state/event model to generate a new statistical definition; and
   d) a graphical user interface arranged to display:
      a) a graphical representation of the state/event model, the graphical representation comprising graphical elements representing the plurality of states of the state/event model; and
      b) said newly generated statistical definition using the graphical representation of the state/event model and an additional graphical element, said additional graphical element being arranged such that only a single graphical element is required to represent a selected one of: (a) a virtual transition between two or more states of the state/event model; and (b) a transition between two or more states which are of different objects of the state/event model, and wherein said additional graphical element is added to the graphical representation in addition to the graphical elements representing the plurality of states of the state/event model.

14. A contact center comprising an apparatus as claimed in claim 13.

15. A self-service system comprising an apparatus as claimed in claim 13.

16. A non-transitory computer readable storage medium embodying a computer program comprising program code executable by a processor of a computing device, said program code comprising:

code for accessing a state/event model of an automated system, the state/event model comprising a plurality of states;

code for displaying a graphical representation of the state/event model at a user interface, the graphical representation comprising graphical elements representing the plurality of states of the state/event model;

code for receiving user inputs comprising information to select states from the state/event model to generate a new statistical definition; and code for displaying at the user interface said newly generated statistical definition using the graphical representation of the state/event model and an additional graphical element, said additional graphical element being arranged such that only a single graphical element is required to represent a selected-one of: (a) a virtual transition between two or more states of the state/event model; and (b) a transition between two or more states which are of different objects of the state/event model, and wherein said additional graphical element is added to the graphical representation in addition to the graphical elements representing the plurality of states of the state/event model.

17. A method of creating a state/event model having a plurality of states comprising the steps of:

a) using Unified Modeling Language (UML) to create a graphical representation of said state/event model, the graphical representation comprising graphical elements representing the plurality of states of the state/event model;

b) adding a single graphical element to the graphical representation to represent a selected one of: (i) a virtual transition between two or more states of said state/event model; and (ii) a transition between two or more states which are of different objects of the state/event model;

wherein said single graphical element is added to the graphical representation in addition to the graphical elements representing the plurality of states of the state/event model.

18. A method as claimed in claim 17 wherein said single graphical element has an associated markup statement comprising a guard condition.

19. A method as claimed in claim 17 wherein said single graphical element comprises an action expression.

20. An apparatus for creating a state/event model having a plurality of states comprising:

a) a processor executing program code arranged to use Unified Modeling Language (UML) to create a graphical representation of said state/event model, the graphical representation comprising graphical elements representing the plurality of states of the state/event model;

b) said processor also executing program code arranged to add a single graphical element to the graphical representation to represent a selected one of:

(i) a virtual transition between two or more states of said state/event model; and (ii) a transition between two or more states which are of different objects of the state/event model;

wherein said single graphical element is added to the graphical representation in addition to the graphical elements representing the plurality of states of the state/event model.

* * * * *